US008682900B2

(12) United States Patent  (10) Patent No.: US 8,682,900 B2
Ragusa et al.  (45) Date of Patent:  Mar. 25, 2014

(54) SYSTEM, METHOD AND COMPUTER PROGRAM PRODUCT FOR DOCUMENTS RETRIEVAL

(75) Inventors: Roberto Ragusa, Lucera (IT); Ciro Ragusa, Lucera (IT); Roberto Guarda, Pomezia (IT)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 12/897,958

(22) Filed: Oct. 5, 2010

(65) Prior Publication Data

US 2011/0137912 A1  Jun. 9, 2011

(30) Foreign Application Priority Data

Dec. 8, 2009  (EP) ..................... 09178386

(51) Int. Cl.
*G06F 7/00* (2006.01)
*G06F 17/30* (2006.01)

(52) U.S. Cl.
USPC .......................................... 707/741

(58) Field of Classification Search
USPC ......... 707/602, 603, 673, 696, 706, 711, 715, 707/722, 741–746, 750, 752–754, 759, 763, 707/769, 770
See application file for complete search history.

(56) References Cited

U.S. PATENT DOCUMENTS

| | | | |
|---|---|---|---|
| 6,199,062 B1 | 3/2001 | Byrne et al. | |
| 6,775,666 B1 | 8/2004 | Stumpf et al. | |
| 7,398,201 B2 | 7/2008 | Marchisio et al. | |
| 2002/0059161 A1 | 5/2002 | Li | |
| 2002/0091512 A1* | 7/2002 | Karttunen et al. | 704/202 |
| 2006/0010126 A1 | 1/2006 | Anick et al. | |
| 2008/0077570 A1* | 3/2008 | Tang et al. | 707/5 |

FOREIGN PATENT DOCUMENTS

WO    2006068872 A3   6/2006

OTHER PUBLICATIONS

Bo-Yeong Kang, "Document indexing: A concept-based approach to term weight estimation", Information Processing and Management, vol. 41, Issue 5, pp. 1065-1080.
Anand Kumar, "Word Hashing for Efficient Search in Document Image Collections", Master Thesis, International Institute of Information Technology, Hyderabad, India, Jun. 2008, 112 pages.
The Apache Software Foundation, "Multi-word Synonym Filter (Synonym Expansion at Indexing Time)", Apr. 28, 2009, 2 pages, http://issues.apache.org./jira/browse/LUCENE-1622.
IBM, "Designing an Index for a Softcopy Document", Copyright 1990, 2007, 2 pages.
New Idea Engineering, "What's the Difference Between Stemming and Lemmatization?—Ask Dr. Search", Printed May 27, 2009, 7 pages.

* cited by examiner

*Primary Examiner* — Khanh Pham
*Assistant Examiner* — Reza Hosseini
(74) *Attorney, Agent, or Firm* — Douglas A. Lashmit; Hoffman Warnick LLC

(57) ABSTRACT

The invention provides a system and method for retrieving documents from a collection of documents that match a word search query. A word index is generated for each document in which each entry is an enriched-term string built from the stemmed form of the word to be searched and a separator character followed by the original form of the word to be searched. During a retrieving operation, a search query is processed depending the original form or the stemmed form of a word to be searched. Cross-documents tables are addressed to find documents that match the enriched-term string of the word to be searched.

15 Claims, 12 Drawing Sheets

200

| Original word (202) | Stemmed form (204) |
|---|---|
| car | car |
| cars | car |
| care | care |
| careful | care |
| be | be |
| am | be |
| is | be |
| are | be |
| was | be |
| were | be |
| being | be |
| been | be |
| bee | bee |
| bees | bee |

FIG.2

Textual documents 302

| 0 | Many cars are in these streets. |
| 1 | This is the street where my car is. |
| 2 | This street is for street cars. |

Term extraction (stemmed) 304

| 0 | many car be in this street |
| 1 | this is the street where my car be |
| 2 | this street be for street car |

Term dictionary 306

| TERM | TERM_ID |
| --- | --- |
| be | 0 |
| car | 1 |
| for | 2 |
| in | 3 |
| many | 4 |
| my | 5 |
| street | 6 |
| the | 7 |
| this | 8 |
| where | 9 |

Term occurrence 308

| TERM_ID | DOC_ID |
| --- | --- |
| 0 | 0 |
| 0 | 1 |
| 0 | 2 |
| 1 | 0 |
| 1 | 1 |
| 1 | 2 |
| 2 | 2 |
| 3 | 0 |
| 4 | 0 |
| 5 | 1 |
| 6 | 0 |
| 7 | 1 |
| 7 | 2 |
| 8 | 1 |
| 9 | 0 |
| 9 | 1 |
| 9 | 2 |
| 10 | 1 |

Enriched-Term dictionary 606   Enriched-Term occurrence 608

| TERM | TERM_ID |
|---|---|
| be\|be\|are\|are | 0 |
| be\|be\|is\|is | 1 |
| for\|for\|for\|for | 2 |
| in\|in\|in\|in | 3 |
| many\|many\|many\|Many | 4 |
| my\|my\|my\|my | 5 |
| street\|street\|street\|street | 6 |
| street\|street\|street\|streets | 7 |
| the\|the\|the\|the | 8 |
| this\|this\|these\|these | 9 |
| this\|this\|this\|This | 10 |
| vehicle\|car\|car\|car | 11 |
| vehicle\|car\|cars\|cars | 12 |
| where\|where\|where\|where | 13 |

| TERM_ID | DOC_ID |
|---|---|
| 0 | 0 |
| 1 | 1 |
| 1 | 2 |
| 2 | 2 |
| 3 | 0 |
| 4 | 0 |
| 5 | 1 |
| 6 | 1 |
| 6 | 2 |
| 7 | 0 |
| 8 | 1 |
| 9 | 0 |
| 10 | 1 |
| 10 | 2 |
| 11 | 1 |
| 12 | 0 |
| 12 | 2 |
| 13 | 1 |

FIG.6-b

SYSTEM, METHOD AND COMPUTER PROGRAM PRODUCT FOR DOCUMENTS RETRIEVAL

FIELD OF THE INVENTION

The present invention relates to the field of information retrieval (IR), and more particularly to a system and method for indexing textual documents for successive document retrievals.

BACKGROUND ART

In today's world of wide information availability, searching documents with queries of the kind "which documents contain word X ?" may take unacceptable time (e.g., several hours) and computing power to execute an exhaustive scan through all available documents (considering several millions of documents). The state of the art of information retrieval solutions allow the building of indexes which map words to documents. Such an index, generally called inverted-index, offers a representation to answer those queries of the kind "which documents contain word X ?". Storing an index thus optimizes speed and performance in finding relevant documents for a search query.

A query is often expressed in a form like "car AND (boat OR ship)". Handling of functions with Boolean operators is a computer process handled at a high level while at the low level the query is processed as simple queries like "which documents contain word X". Such a single word query is generally executed following the steps of:
(a) looking into a term dictionary table to identify a Term_id associated with a searched word; and
(b) looking into a term occurrence table to identify documents (Doc_id) associated with the Term_id previously identified.

Both steps are performed on tables, and specifically on a first column of tables generally ordered alphabetically or numerically. Accessing tables that may be stored on a disk device may be a very slow operation as random access to rows implies physical disk head movement. To this extent, to balance slow access, an efficient bisection algorithm, requiring log 2(N) steps, where N is the number of rows of the tables, is often required.

A single word query is illustrated with reference to FIG. 1, where a simple inverted index is used. For sake of illustration, only three documents are shown (0, 1, 2) each including a short sentence (102). However, the person skilled in the art would extend the description to longer text such as entire paragraphs or chapters of a book. A term extraction operation is applied to each sentence which leads to isolating each word by removing the punctuation and converting all words into their lower-case (as shown on table 104). A term dictionary table (106) is built from the term extraction table, where each item of a row (TERM) is one word of the term extraction table identified by a term_id (TERM-ID). The value of the identifier term-id may be the position of the term in the list, for example its position in the alphabetically order. A term occurrence table (108) is built from the term dictionary table mapping each term-id listed in the term dictionary table to the corresponding set of documents (DOC-ID) wherein the original word appears (note that each term-id can be associated to more than one doc-id, indicating the word is present in several documents).

In the example of FIG. 1, 14 term-Ids (0 to 13) have been mapped to 18 Doc-Ids in the term occurrence table 108. It is to be appreciated that in a real context of millions of indexed documents, the term dictionary table can grow to around the size of the dictionary for the language in use (in the order of $10^5$ terms), while the size of the term occurrence table will always be equal to the number of documents times the average of the number of words per document ($10^9$ entries or more).

Moreover, in many if not all applications, one would benefit from retrieving documents containing small variations of a word specified in the query. For example, when searching for the word "election", it could be highly interesting that a document not including the word "election" but including the word "elected", be identified as well. Some linguistic analysis can be done algorithmically on each word to identify the "stem" form of a word. A stem form is the form from which all the variations of a word are generated. For example, the singular form of a name is the origin of the plural form, the infinite form of a verb is the origin for the past form and the progressive form. In some languages (i.e., French, Italian) the number of variations for a word can be very high. Stemming also includes derived adjectives, adverbs or names. For example, the form "base" can be considered the stem for the words "basic", "basically", "based", "basing", "bases". An alternate method to algorithmic stemming is the thesaurus approach. FIG. 2 shows a table (200) illustrating stemmed forms (204) obtained from original words (202).

Several approaches are known for executing stemmed searches using an inverted-index, assuming a stemming algorithm is available for the language of the documents indexed. The most known and used methods are now listed.

A first approach is to build an inverted index of stemmed words, as illustrated on FIG. 3. To allow better understanding of the description, the same set of documents (302) with same sentences are used as in FIG. 1. A term extraction operation using a stemmed algorithm is applied to each sentence which leads to the creation of a term extraction table (304). A term dictionary table (306) is built from the term extraction table (304) where each item (TERM) is associated with its position number in the list (TERM-ID), for example here its position in the alphabetically order. A term occurrence table 308 is built from the term dictionary table and contains pair of integers (TERM-ID/DOC-ID) wherein each term-id listed in the term dictionary table is mapped to the corresponding set of documents (doc-id) wherein it appears. In this example, the size of the term dictionary table (306) is equal to 10 items, which is smaller than for a simple extraction as in FIG. 1 because many terms collapse into a single term. The size of the term occurrence table (308) remains identical to the case of a simple extraction. However, a drawback of such an approach is mainly that the inverted index of stemmed words does not permit searches for original words, because the queried terms have to be preprocessed with the same stemming algorithm used for indexing. The original words are then 'lost' by the stemming operation and do not appear in the dictionary anymore. This loss of functionality is rarely acceptable. A remedy to this drawback is often encountered by building two indexes, one for original words and one for stemmed forms, and to use the appropriate index when searching a word. However, gaining complete search functionality results in a doubling of the index size, thus highly impacting the search speed, particularly because of worse cache memory hit ratio.

Another approach to achieve stemmed and original words search ability is to expand a query to be executed into a logical OR of several queries, each query aiming at a different variation of the stemmed form of the word that is specified in the original query. For example, if the query is on the word "are" and a stemming operation is active, all words which have a stemmed form of "be" will be searched. A reverse-stemming algorithm or a thesaurus will enumerate all the derived forms of the stemmed word (that is for word "be" the expansion would target the variations "be", "being", "been", "am", "is", "are", "was", "were"), and the query will be executed as the logical operation "be" OR "being" OR "been" OR "am" OR "is" OR "are" OR "was" OR "were". With the expanded query, a complete functionality is achieved and the index size is not increased. However, search performance is degraded as one search is expanded into N ORed logical searches. Additionally, with such a method the child searches can be "sparse" anywhere in the index. For example, taking the eight variations of the word <<be>>, a search into the term dictionary table (106) would provide two candidates TERM_ID0 and TERM_ID5, the variants "are" and "is". As the two TERM_IDs are not adjacent, they would have to be read on different parts of the term occurrence table. As this table is generally a very large database, searching speed is highly impacted by such query expansion searching method.

U.S. 2002/0059161 to Li discloses a method and apparatus for query expansion using reduced size indices and for progressive query processing. Queries are expanded conceptually, using semantically similar and syntactically related words to those specified by the user in the query to reduce the chances of missing relevant documents. The notion of a multi-granularity information and processing structure is used to support efficient query expansion, which involves an indexing phase, a query processing and a ranking phase.

Accordingly, searching in a very large collection of documents by the known methods to perform conceptual similarity search is either a search in an inflated index or a sequence of sub-searches. An alternative remains to use only the original form of words and to ignore variations, but this lowers the quality of the search results.

SUMMARY OF THE INVENTION

There is need for improved techniques for easily and quickly searching large databases which overcome the drawbacks of previous existing searching methods. Further, a need exists for a high quality document searching method and system with a low cost indexing algorithm. The present invention addresses the aforementioned limitations and shortcomings of the prior art.

The present invention provides a system and method for building an index of terms for efficient document searching. Further, the present invention provides a method and system for processing original word queries as well as stemmed word queries without index inflation.

According to an aspect of the invention, a computer implemented method for retrieving documents from a collection of documents is provided. Each document of the collection of documents is identified and a word index is generated. Each entry of the word index is an enriched-term string comprising at least a stemmed form of a word, a separator character followed by an original form of the word. A cross-documents list of all the enriched-term strings is generated, wherein each enriched-term string is identified by a respective enriched-term identifier. A cross-documents term occurrence table is built for matching each enriched-term identifier to the identified documents.

Further aspects of the invention will now be described, by way of implementation and examples, with reference to the accompanying figures.

BRIEF DESCRIPTION OF THE DRAWINGS

The above and other items, features and advantages of the invention will be better understood by reading the following more particular description of the invention in conjunction with the figures.

FIG. 2 illustrates a stemming operation on a list of original words.

FIG. 3 shows a prior art inverted index building sequence based on stemmed terms extraction.

DETAILED DESCRIPTION OF THE INVENTION

Generally speaking, the present invention relies on using an inverted index, wherein the index contains a list of "enriched" terms derived from the original words included in the documents to be indexed. An "enriched" term is a string built from the original word and from at least the respective stemmed form. The string further includes a character separator between the original word and the stemmed word. The separator is chosen to be a specific character such as a vertical bar (pipe symbol) represented as '|' or any character which is not expected to be generally present in a word (for example a non-alphabetical character).

The indexing operation comprises first preprocessing steps on the words that are extracted from a document in order to:
(a) calculate the stemmed form of an original word; and
(b) create the enriched-term string composed of the stemmed form of the original word, the separator, followed by the original word.

As an example, the original word "car" leads to the enriched-term string "car|car". Similarly, the original word "cars" leads to the enriched-term string "car|cars". It is to be appreciated that the stemmed form can be set in the first part of the enriched term (or first position) and the original word can be set in the ending part of the enriched term (or second position) separated by the separator character. The choice of such position leads to better performance but alternate implementations are operable with the method of the present invention.

Embodiments of the present invention are now described hereinafter by way of examples with reference to the accompanying FIGS. 4 to 11.

Figure 1:
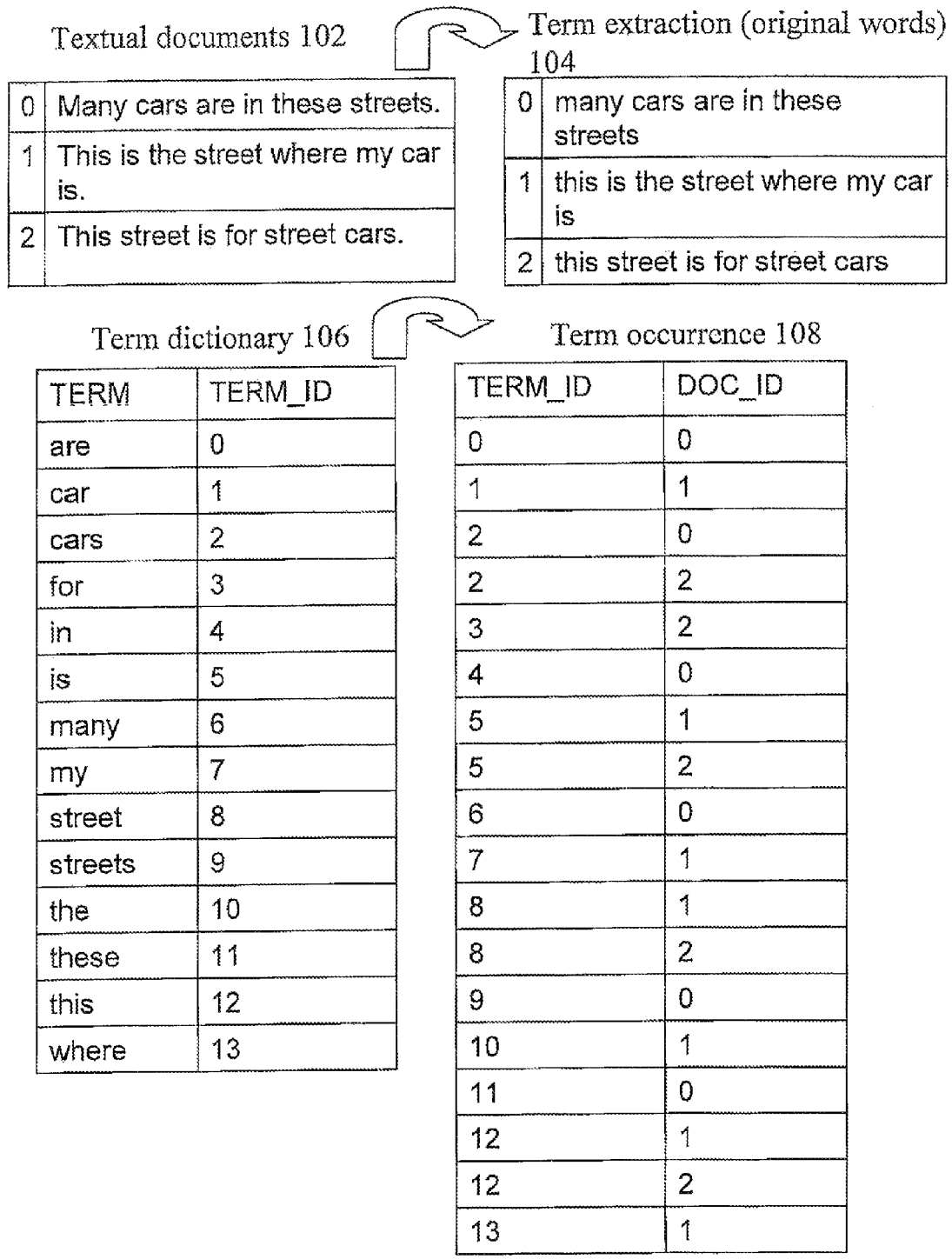
FIG. 1 shows a prior art inverted index building sequence based on original terms extraction.
Figure 4:
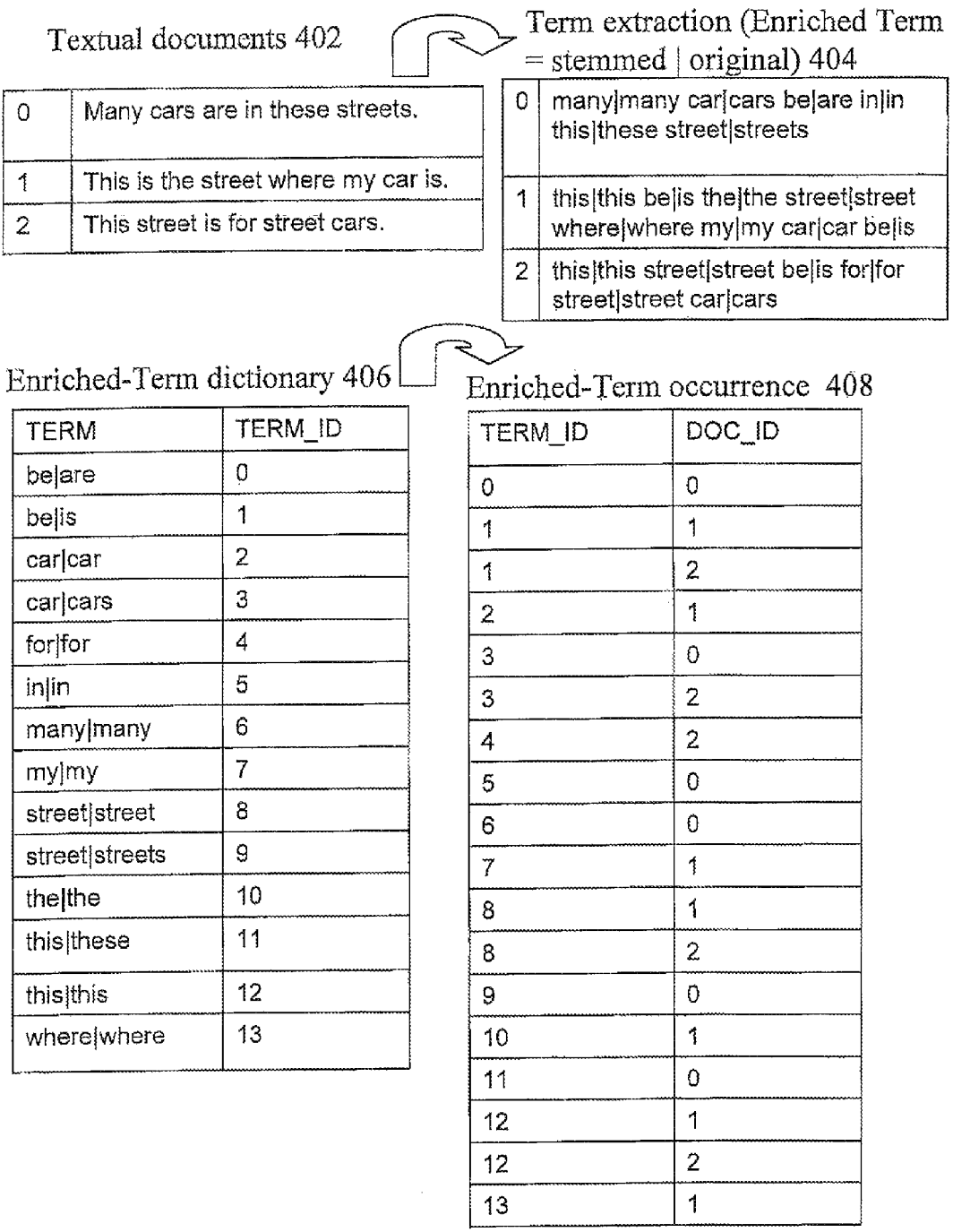
FIG. 4 shows an inverted index building sequence according to an embodiment of the present invention.

Referring now to FIG. 4, an example involving an index for 3 textual documents (402) is described. As shown with reference to enriched-term dictionary table (406), the size of the enriched-term dictionary containing 14 entries is similar to the size of the term dictionary (106 from FIG. 1) built on original words. It is nevertheless to be noted that the string length of each term is doubled, but as previously stated, the size of the dictionary is seldom critical and thus this is a small penalty as it tends to grow slowly as it asymptotically reaches the number of words in the natural language in use. However, the person skilled in the art will note that an important advantage of the present invention is that the size of the enriched-term occurrence table (408) is not increased and remains equal to the size of the respective table in the original extraction case (108 from FIG. 1).

Figure 7:
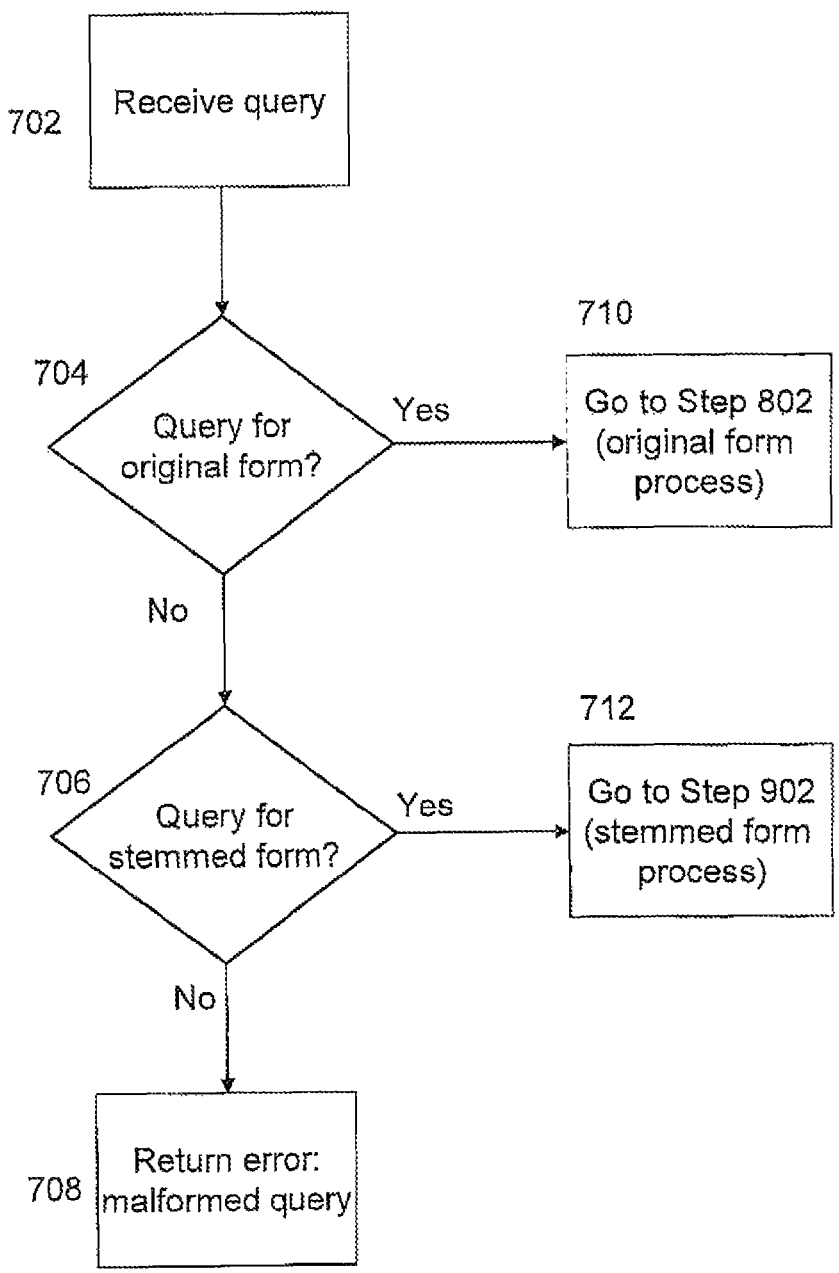
FIG. 7 is a flow chart of the steps for processing a query by the method of the present invention.

A query is processed as shown on the flow chart of FIG. 7. When received on step 702, a check is made to determine if the query is directed to the original form of the word (step 704) or to the stemmed form of the word (step 706). If the original form is queried (Yes, step 704), then the process goes to routine 710 to run the appropriate process, later described with reference to FIG. 8. If the stemmed form is queried (Yes, step 706), then the process goes to routine 712 to run the appropriate process, later described with reference to FIG. 9.

In case the query is not for one of the original or stemmed form (No, step 706), then the process ends with an error message (step 708).

Figure 8:
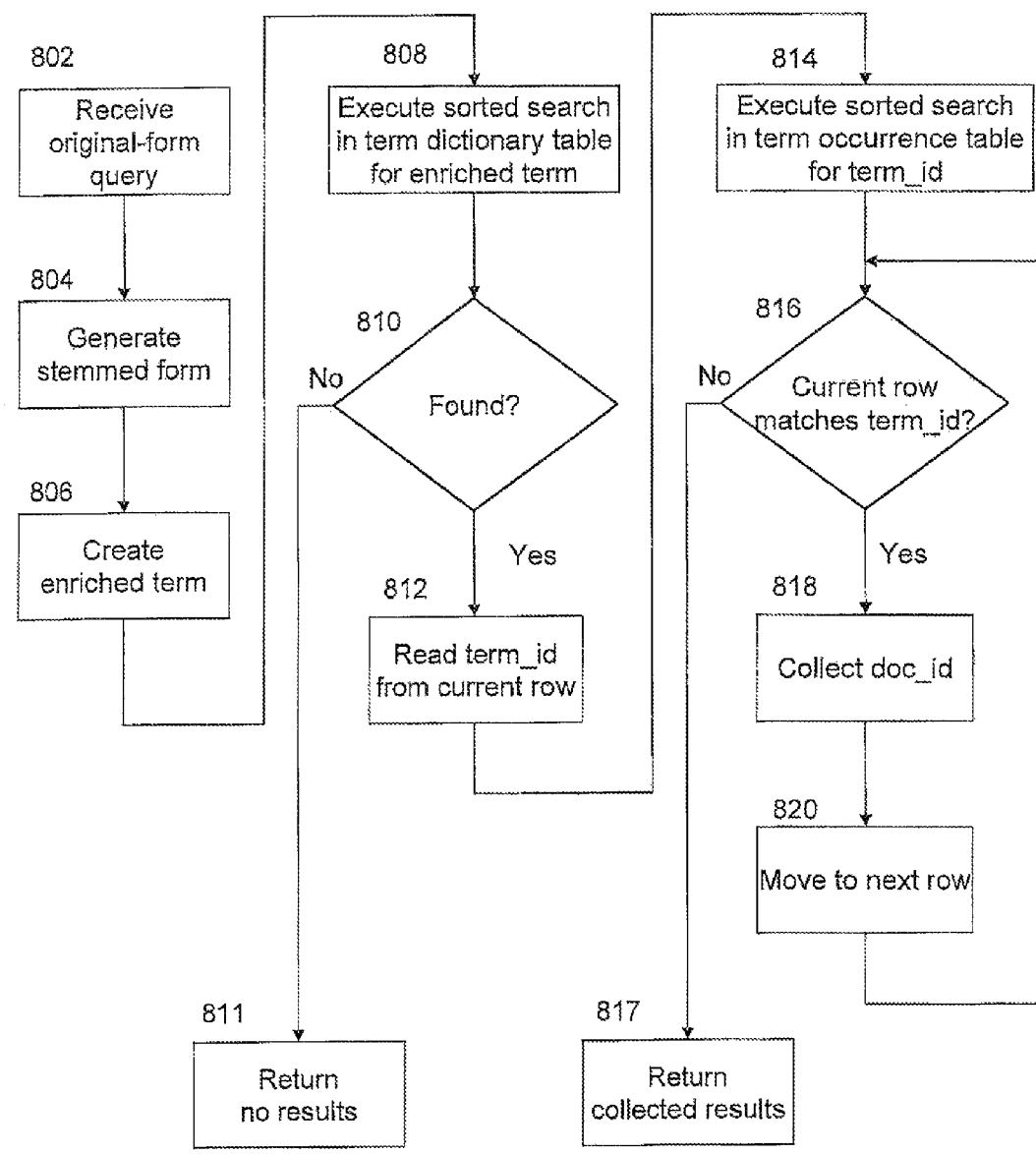
FIG. 8 is a flow chart of the steps for processing an original-form query according to an embodiment of the present invention.

Going now to FIG. 8, the process executed when a query received (802) is directed to the original form of a word is described.

On step 804, the stemmed form of the word to be searched is generated.

On next step 806, an enriched term is built by creating the string "stemmed form, separator, original word".

Next, on steps 808, 810 and 812, a binary search is made on the enriched term in the enriched-term dictionary table to identify the term_id associated to the enriched term. If no term-id is found (No, step 810) the process ends and a 'zero result' message is returned (811).

On step 814, a binary search is made in the enriched-term occurrence table to identify the first document reference doc_id matching the term_id.

Then, the process scans down (816, 818, 820) the enriched-term occurrence table, collecting all the doc_id until the term_id changes (No, step 816). All documents identified are provided on step 817.

Figure 9:
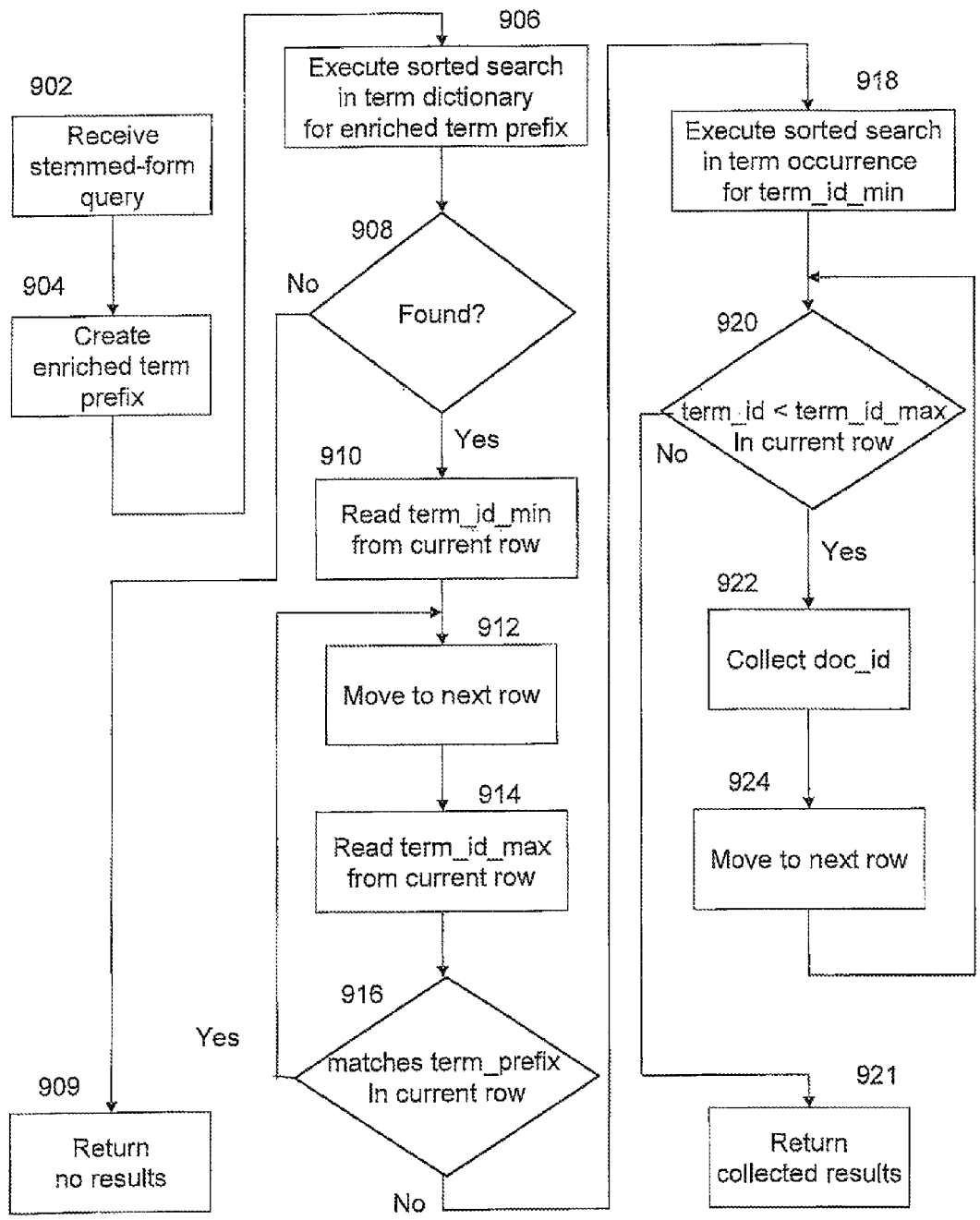
FIG. 9 is a flow chart of the steps for processing a stemmed-form query according to an embodiment of the present invention.

Referring to FIG. 9, the process executed when a query received (902) is directed to the stemmed form of a word is now described.

On steps 904, 906 and 908, a binary search is made in the enriched-term dictionary table (906) to find the first enriched term where the stemmed part (enriched term prefix) matches the stemmed word form received in the query.

If a match is found (Yes, step 908) the corresponding term_id of the first term is identified as "term_id_min" on step 910. In case of no match (No, step 908), the process ends and a 'zero result' message is returned (909).

Next, the process scan down the enriched-term dictionary table (912, 914, 916) until the current term has a different stemmed prefix. The first unmatched term is identified as "term_id_max", and the scan process stops (No, step 916).

On next step 918 a binary search is made in the enriched-term occurrence table to identify the first row of the term_ID entries matching the term_id_min.

Then, the process scans down (920, 922, 924) the enriched-term occurrence table, collecting all the doc_id while the current term_id>=term_id_min and term_id<term_id_max. All documents identified are provided on step 921.

Going back to FIG. 4, the processes previously described are exemplified. A query in the form of "<STEMMED>cars" is received. A binary search in the enriched-term dictionary table is made to identify a first term starting with the stemmed term prefix of "car|". The result provides term_id=2=term_id_min.

The next rows are checked until the stemmed term prefix does not match, as it is for the term "for|". The result provides that for term_id_=4 the prefix does not match. So, term_id_max=4.

The binary search then performed in the enriched-term occurrence table 408 identifies the fourth row (the one with values 2 for term_id and value 1 for doc_id) as being the first one with term_id>=term_id_min.

All doc_ids that are listed until the term_id is <term_id_max are then collected and provide doc_id 1, 0, 2.

Then, the result provided in answer to the query is documents 0, 1 and 2 as they actually all include "car" or "cars".

The person skilled in the art will easily extend the simple previous example to any more complex query.

It is to be appreciated that both query types (on original or stemmed form) are executed with a performance very similar to the performance of searches using a normal inverted index (without stemming). While the stemmed queries involve an additional sequential scan of the enriched-term dictionary table, it is to be reasonably expected that such a scan would involve only a few terms (an average could easily be lower than 10), which then does not impact time search, even when disk access is involved because when the disk head reaches the correct position, it is almost irrelevant how many bytes will be read.

The method of the present invention can be easily extended to more than two forms of a word. For example, one could desire to execute queries with strict case-sensitiveness, where "Car" is a different search than "car". Replacing the stemming algorithm with a lower-case conversion algorithm, will allow to run the same method and use the enriched 'lower-case' terms such as "car|Car".

Figure 5:
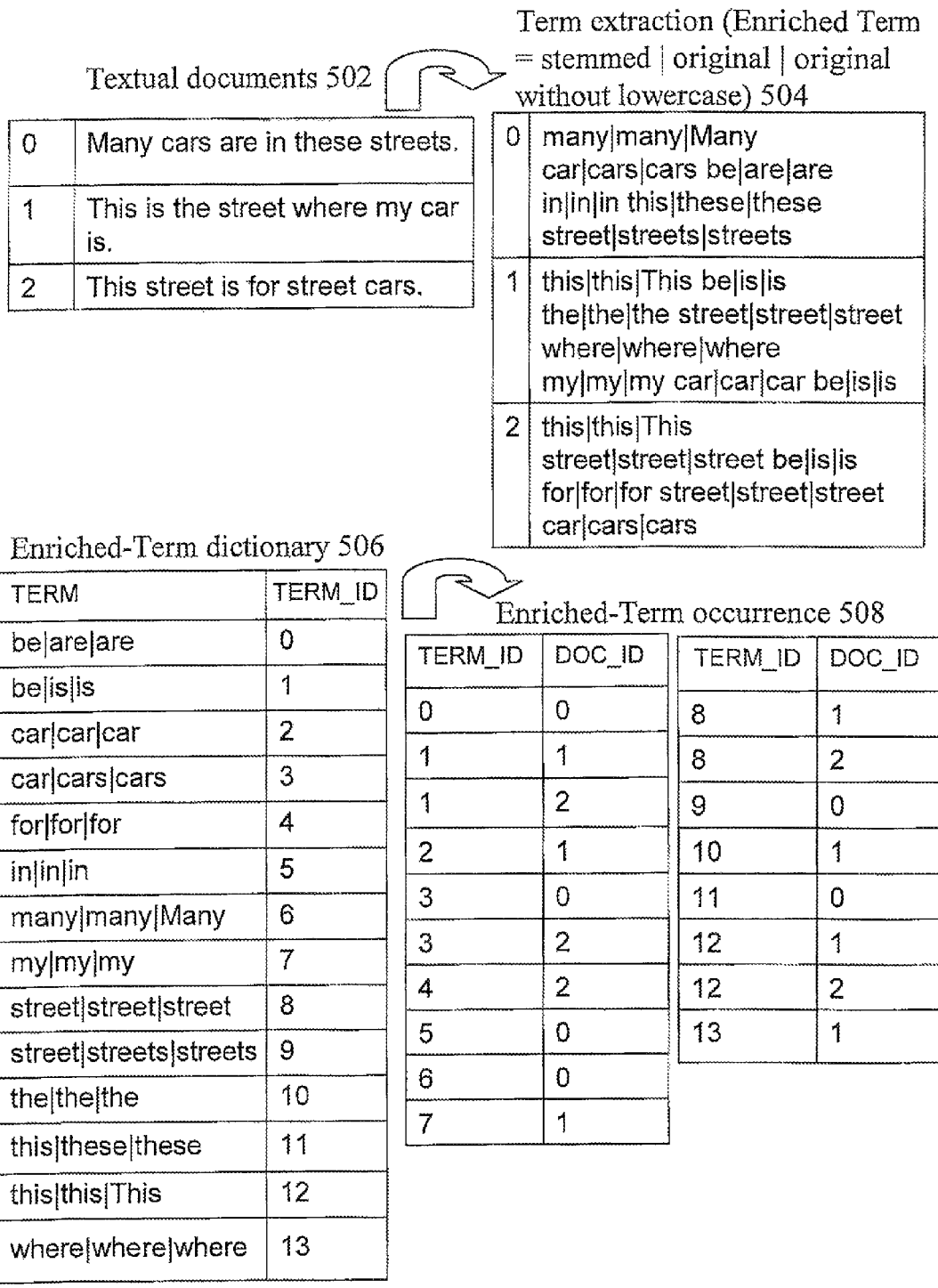
FIG. 5 shows an inverted index building sequence according to another embodiment of the present invention.
Figure 6:
FIGS. 6-a and 6-b-show an inverted index building sequence according to another embodiment of the present invention.

Additionally, the method is operable on an enriched term composed of more than 2 parts as illustrated in FIGS. 5 and 6. For example the string "car|cars|Cars" would represent the stemmed form plus the lower-case form plus the original word "Cars".

FIG. 5 shows on table 504 the enriched terms obtained for the words extracted from sentences of documents 0, 1 and 2 similar to those of FIG. 4. One skilled in the art would note that the size of the index would be just a bit larger than in the case of FIG. 4 because of longer enriched term strings. Three kind of queries may be processed:

a) the first one is "<ORIGINALCASE>Cars", which will be executed as "car|cars|Cars" and run through the process of FIG. 8 as the exact search;

b) the second one is "<LOWERCASE>Cars", which will be executed as "car|cars|*" and run through the process of FIG. 9 as prefix search; and c) the third one is "<STEMMED>Cars", which will be executed as "car|*" and run through the process of FIG. 9 as prefix search.

In another variation, the enriched term could be expanded to include a 'Concept' level to group together several stems in a single larger category. An example of such an enriched term with a concept part is shown on FIG. 6-*a* with the string "vehicle|car|cars|cars". The enriched form is as for the previous cases obtained by starting from the original word, generating the immediate left positioned term and repeating for the additional terms, the sequence being: original-case=>lower-cased=>stemmed=>concept.

It should be appreciated that more than four levels can be included in the enriched term string, provided the enriched term is generated by applying a similar sequence.

In addition to the kind of queries described above, more sophisticated queries can also be used. For example, prefix queries such as "ca*" or wildcard queries such as "*e*t*".

The prefix query would match terms such as "car", "cars", "cave", "cascade", etc., while the second wildcard query would match terms such as "best", "street", "resting", etc.

These kind of queries can be mapped to equivalent queries for enriched terms. For example, when using the three level enrichment, the prefix query "ca*" becomes the enriched term "*|ca*|*" assuming case insensitiveness or becomes "*|*|ca*" assuming case sensitiveness. Similarly, the wildcard query "*e*t*" becomes the enriched term "*|*e*t*|*" or "*|*|*e*t*".

Figure 10:
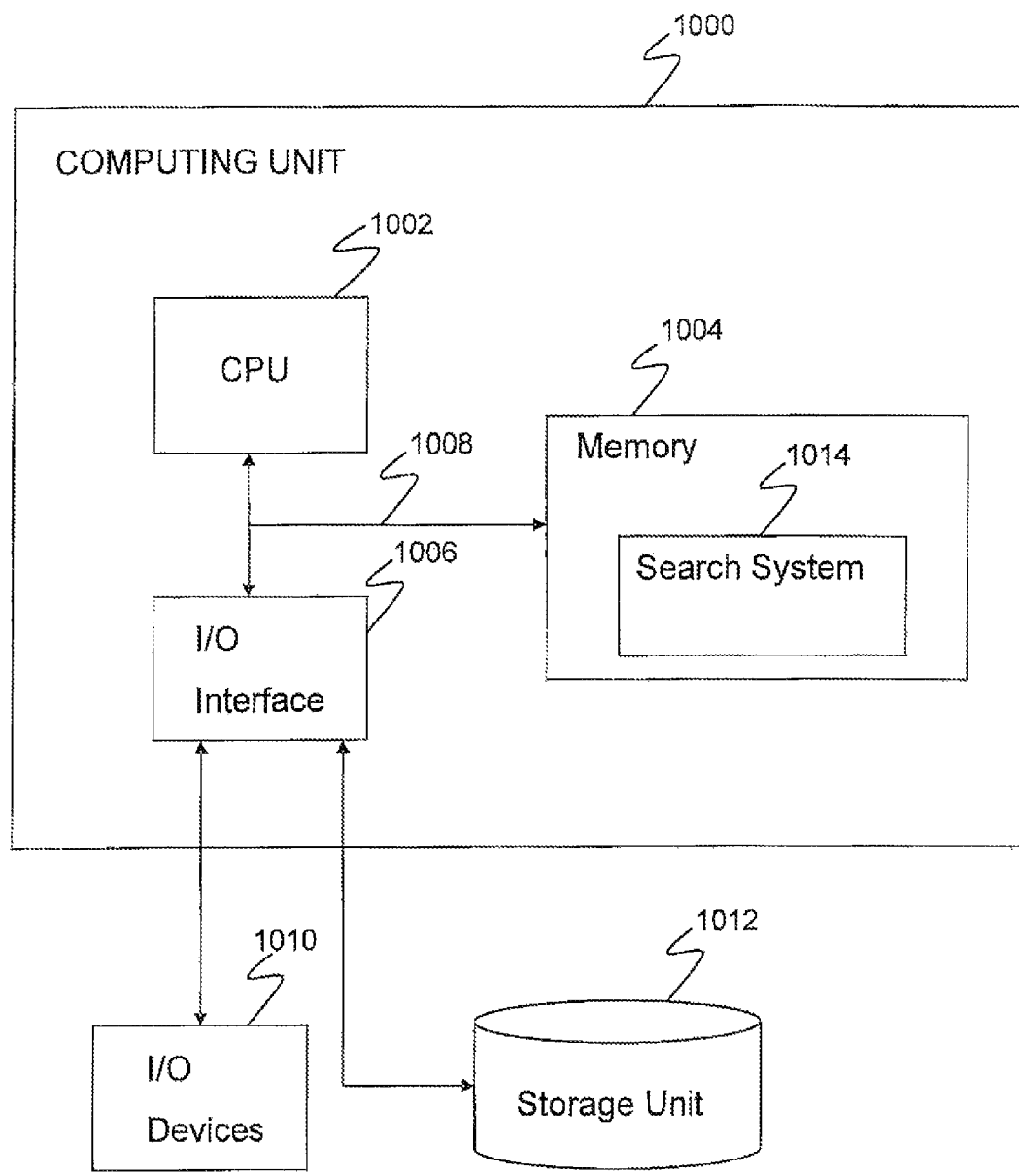
FIG. 10 is a block diagram of a computer system for implementing the method of the present invention.

Referring now to FIG. 10, a computer system for implementing the method of the present invention is shown. Computing unit 1000 is suitable for storing and/or executing program code of a search system 1014 in accordance with several embodiments of the present invention, and generally comprises a central processing unit (CPU) 1002, a memory 1004, an input/output (I/O) interface 1006, a bus 1008, I/O devices 1010, and a storage unit 1012. CPU 1002 performs computation and control functions of computing unit 1000. CPU 1002 may comprise a single processing unit, or be distributed across one or more processing units in one or more locations (e.g., on a client and server).

Local memory elements of memory 1004 are employed during actual execution of the program code of search system 1014. Further, memory 1004 may include other systems not shown in FIG. 10, such as an operating system (e.g., Linux) that runs on CPU 1002 and provides control of various components within and/or connected to computing unit 1000.

Memory 1004 may comprise any known type of data storage and/or transmission media, including bulk storage, magnetic media, optical media, random access memory (RAM), read-only memory (ROM), a data cache, a data object, etc. Storage unit 1012 is, for example, a magnetic disk drive or an optical disk drive that stores data. Moreover, similar to CPU 1002, memory 1004 may reside at a single physical location, comprising one or more types of data storage, or be distributed across a plurality of physical systems in various forms. Further, memory 1004 can include data distributed across, for example, a LAN, WAN or storage area network (SAN) (not shown).

I/O interface 1006 comprises any system for exchanging information to or from an external source. I/O devices 1010 comprise any known type of external device, including a display monitor, keyboard, mouse, printer, speakers, handheld device, printer, facsimile, etc. Bus 1008 provides a communication link between each of the components in computing unit 1000, and may comprise any type of transmission link, including electrical, optical, wireless, etc.

I/O interface 1006 also allows computing unit 1000 to store and retrieve information (e.g., program instructions or data) from an auxiliary storage device (e.g., storage unit 1012). The auxiliary storage device may be a non-volatile storage device (e.g., a CD-ROM drive which receives a CD-ROM disk). Computing unit 1000 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable storage medium providing program code of search system 1014 for use by or in connection with a computing unit 1000 or any instruction execution system to provide and facilitate the capabilities of the present invention. For the purposes of this description, a computer-usable or computer-readable storage medium can be any apparatus that can contain, store, communicate, or transport the program for use by or in connection with the instruction execution system, apparatus, or device.

The medium can be an electronic, magnetic, optical, electromagnetic, infrared, or a semiconductor system (or apparatus or device). Examples of a computer-readable storage medium include a semiconductor or solid state memory, magnetic tape, a removable computer diskette, RAM 1004, ROM, a rigid magnetic disk and an optical disk. Current examples of optical disks include compact disk-read-only memory (CD-ROM), compact disk-read/write (CD-R/W) and DVD.

Figure 11:
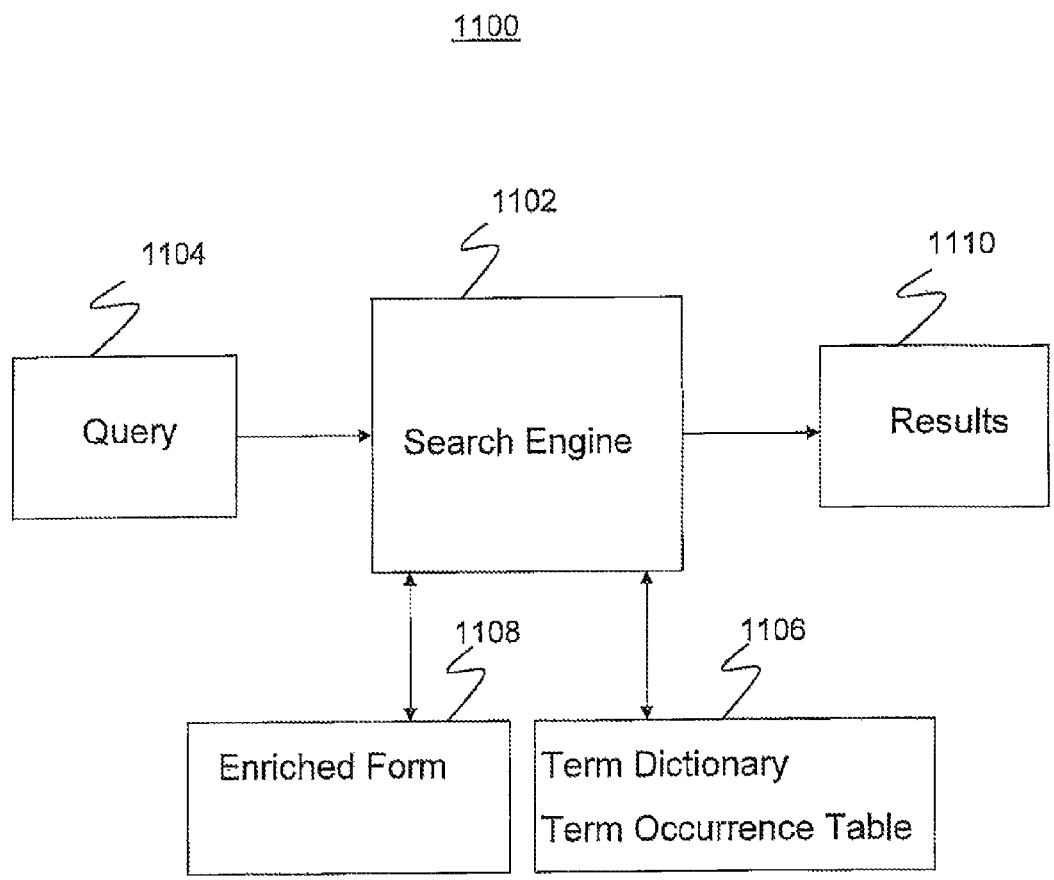
FIG. 11 is a block diagram of computer implemented components for operating the process of FIGS. 7 to 9 in accordance with embodiments of the present invention.

FIG. 11 shows a block diagram of computer implemented components for operating the process of FIGS. 7 to 9 in accordance with embodiments of the present invention. The information retrieval system 1100 includes a search engine component 1102 which is coupled to a search query receiving module 1104. Search engine 1102 extracts received terms to create or retrieve enriched forms from an enriched form module 1108. Further, search engine 1102 uses the enriched forms to build an enriched-term dictionary and an associated enriched-term occurrence table 1106. Still further, search engine 1102 executes one of the search processes to issue search results 1110 for the query.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer implemented method for retrieving documents from a collection of documents, the method comprising:

identifying each document of the collection of documents;
generating a word index for each document of the collection of documents, wherein each entry of the word index is an enriched-term string comprising a stemmed form of a word, an original form of the word, a separator character separating the stemmed form of the word from the original form of the word, a second separator character after the original form of the word followed by a lower-case version of the original form of the word and, before the stemmed form of the word, a first conceptual version of the word followed by a third separator character;
generating a cross-documents list for the enriched-term strings wherein each enriched-term string is identified by an enriched-term identifier; and
generating a cross-documents enriched-term occurrence table for matching each enriched-term identifier to the identified documents.

2. The method of claim 1, wherein the generating a word index further comprises:
   extracting words to be indexed from each document of the collection of documents; and
   generating the respective stemmed form of each extracted word.

3. The method of claim 2, further comprising:
   building an enriched-term string from each respective stemmed form.

4. The method of claim 1, wherein the separator character, the second separator character, and the third separator character are non-alphabetical characters.

5. The method of claim 1, wherein the generating the cross-documents list further comprises:
   crossing and sorting the enriched-term strings by alphabetical order.

6. The method of claim 1, further comprising:
   receiving a word search query;
   building an enriched-term string from the word to be searched;
   successively scanning the cross-documents list and the cross-documents enriched-term occurrence table; and
   reporting the document identifiers matching the word search query.

7. The method of claim 6, further comprising, after receiving the word search query:
   determining whether the word to be searched is an original form or a stemmed form of a word.

8. A system for retrieving documents from a collection of documents, the system comprising at least one computer system for carrying out a method, the method comprising:
   identifying each document of the collection of documents;
   generating a word index for each document of the collection of documents, wherein each entry of the word index is an enriched-term string comprising a stemmed form of a word, an original form of the word, a separator character separating the stemmed form of the word from the original form of the word, a second separator character after the original form of the word followed by a lower-case version of the original form of the word and, before the stemmed form of the word, a first conceptual version of the word followed by a third separator character;
   generating a cross-documents list for the enriched-term strings wherein each enriched-term string is identified by an enriched-term identifier; and
   generating a cross-documents enriched-term occurrence table for matching each enriched-term identifier to the identified documents.

9. A computer program, stored on a non-transitory computer readable storage medium, for retrieving documents from a collection of documents, when executed on a computing device, the computer program comprising instructions for:
   identifying each document of the collection of documents;
   generating a word index for each document of the collection of documents, wherein each entry of the word index is an enriched-term string comprising a stemmed form of a word, an original form of the word, a separator character separating the stemmed form of the word from the original form of the word, a second separator character after the original form of the word followed by a lower-case version of the original form of the word and, before the stemmed form of the word, a first conceptual version of the word followed by a third separator character;
   generating a cross-documents list for the enriched-term strings wherein each enriched-term string is identified by an enriched-term identifier; and
   generating a cross-documents enriched-term occurrence table for matching each enriched-term identifier to the identified documents.

10. The computer program of claim 9, wherein the generating a word index further comprises:
    extracting words to be indexed from each document of the collection of documents; and
    generating the respective stemmed form of each extracted word.

11. The computer program of claim 10, further comprising instructions for:
    building an enriched-term string from each respective stemmed form.

12. The computer program of claim 9, wherein the separator character, the second separator character, and the third separator character are non-alphabetical characters.

13. The computer program of claim 9, wherein the generating the cross-documents list further comprises:
    crossing and sorting the enriched-term strings by alphabetical order.

14. The computer program of claim 9, further comprising instructions for:
    receiving a word search query;
    building an enriched-term string from the word to be searched;
    successively scanning the cross-documents list and the cross-documents enriched-term occurrence table; and
    reporting the document identifiers matching the word search query.

15. The computer program of claim 14, further comprising, after receiving the word search query, instructions for:
    determining whether the word to be searched is an original form or a stemmed form of a word.

* * * * *